United States Patent [19]
Charny et al.

[11] Patent Number: 6,108,305
[45] Date of Patent: *Aug. 22, 2000

[54] METHOD AND APPARATUS FOR RELATIVE ERROR SCHEDULING IN A COMMUNICATIONS NETWORK USING DISCRETE RATES AND PROPORTIONAL RATE SCALING

[75] Inventors: Anna Charny; Wing Cheung, both of Sudbury; Peter Roman, Hopkinton; Robert Thomas, Hudson, all of Mass.

[73] Assignee: Compaq Computer Corporation, Houston, Tex.

[ * ] Notice: This patent is subject to a terminal disclaimer.

[21] Appl. No.: 09/197,137

[22] Filed: Nov. 20, 1998

Related U.S. Application Data

[63] Continuation of application No. 08/622,482, Mar. 26, 1996.

[51] Int. Cl.[7] .............................. H04L 1/00; G06F 15/16
[52] U.S. Cl. ......................... 370/232; 709/224; 370/252
[58] Field of Search .................... 370/229, 230, 370/231, 232, 233, 234, 235–236, 395, 396, 397, 398, 411, 412, 413, 414, 415, 416, 417, 418, 420, 428, 429, 252, 253, 468; 395/287, 293, 672, 673, 674; 709/224, 225, 226, 233; 710/60

[56] References Cited

U.S. PATENT DOCUMENTS

| | | | |
|---|---|---|---|
| 5,301,333 | 4/1994 | Lee | 395/725 |
| 5,367,678 | 11/1994 | Lee et al. | 395/650 |
| 5,392,280 | 2/1995 | Zheng | 370/60 |
| 5,434,860 | 7/1995 | Riddle | 370/232 |
| 5,506,969 | 4/1996 | Wall et al. | 395/287 |
| 5,533,009 | 7/1996 | Chen | 370/17 |
| 5,533,020 | 7/1996 | Byrn et al. | 370/60.1 |
| 5,555,244 | 9/1996 | Gupta et al. | 370/60.1 |
| 5,566,163 | 10/1996 | Petit | 370/17 |
| 5,577,035 | 11/1996 | Hayter et al. | 370/60 |
| 5,602,830 | 2/1997 | Fichou et al. | 370/232 |
| 5,619,502 | 4/1997 | Kahn et al. | 370/397 |
| 5,748,614 | 5/1998 | Wallmeier | 370/235 |
| 5,751,709 | 5/1998 | Rathnavedu | 370/395 |
| 5,754,529 | 5/1998 | Heiss | 370/232 |
| 5,771,234 | 6/1998 | Wu et al. | 370/418 |
| 5,781,531 | 7/1998 | Charny | 370/232 |
| 5,828,878 | 10/1998 | Bennett | 395/672 |
| 5,835,494 | 11/1998 | Hughes et al. | 370/232 |

FOREIGN PATENT DOCUMENTS

| | | |
|---|---|---|
| 0 669 777 A1 | 8/1995 | European Pat. Off. . |
| 07221768 | 8/1995 | Japan . |
| 09130398 | 5/1997 | Japan . |

OTHER PUBLICATIONS

Brown, R., "Calendar Queues: A Fast 0(1) Priority Queue Implementation for the Simulation Event Set Problem," *Communications of the ACM* 31(10):1220–1227 (1988).

Xie, G.G. and Lam, S.S., "Delay Guarantee of Virtual Clock Server," *IEEE/ACM Transactions on Networking* 3(6):683–689 (1995).

(List continued on next page.)

*Primary Examiner*—Chi H. Pham
*Assistant Examiner*—Steven Nguyen
*Attorney, Agent, or Firm*—Hamilton, Brook, Smith & Reynolds, P.C.

[57] ABSTRACT

A method of scheduling a plurality of data flows in a shared resource in a computer system, each of the data flows containing a plurality of data cells including the steps of providing a scheduler in the shared resource, initializing the scheduler to receive the plurality of data flows, receiving a first data flow in the scheduler, said first data flow having a first flow rate, receiving a second data flow in the scheduler, said second data flow having a second flow rate, scheduling, by the scheduler, the first data flow and the second data flow such that the first flow rate and the second flow rate are less than an available bandwidth in the shared resource and a relative error is minimized between an actual scheduling time and an ideal scheduling time on a per cell basis, and repeating the steps of receiving and scheduling.

5 Claims, 3 Drawing Sheets

OTHER PUBLICATIONS

Aggarwal, A., et al., "Efficient Routing and Scheduling Algorithms for Optical Networks," (IBM—Research Division T.J. Watson Research Center Yorktown Heights, NY 10598) pp. 412–423.

Hui, J.Y., "Network, Transport, and Switching Integration for Broadband Communications," *IEEE Network*, pp. 40–51 (1989).

Samokhvalenko, A.S., "Integration Errors Due to Nonlinear Frequency Sweeping," Russian Article, pp. 1–5 (1998).

Kline, D., "Scheduler for Rate Based ABR," Memorandum, pp. 1–7 (1994).

Zhang, H., "Service Disciples for Guaranteed Performance Service in Packet–Switching Networks," School of Computer Science, Carnegie Mellon University, pp. 1–23.

Stallings, W., "Data and Computer Communications," 4th Edition, (NJ: Prentice Hall), pp. 203–211 (1994).

METHOD AND APPARATUS FOR RELATIVE ERROR SCHEDULING IN A COMMUNICATIONS NETWORK USING DISCRETE RATES AND PROPORTIONAL RATE SCALING

CROSS REFERENCES TO RELATED APPLICATIONS

This application is a continuation of U.S. patent application Ser. No. 08/622,482 filed Mar. 26, 1996, the entire teachings of which are incorporated herein by reference.

The present invention is related to U.S. patent application Ser. No. 08/579,393 filed Dec. 27, 1995 entitled Method and Apparatus for Rate-Based Scheduling in a Communications Network Using A Relative Error Approach.

FIELD OF THE INVENTION

The present invention relates to the method and apparatus for rate-based scheduling and weighted fair sharing of a common resource. The problem of rate-based scheduling and weighted fair sharing arise in many different contexts and relates, for example, to the field of computer networks or to processor design. In general, this invention relates to any problem of scheduling jobs according to some rates in a broad context of environments and applications.

BACKGROUND OF THE INVENTION

The problem of scheduling different jobs sharing a common resource occurs in many different contexts. In the most general terms it can be formulated as follows:

A single resource of some kind is shared by several entities indexed by integers i=1,2, . . . n. Every entity has a rate R(i) associated with it. The rates are assigned in such a way that sum of all R(i) does not exceed the capacity of the resource. For example, in computer networks the entity is an individual flow, and the shared resource may be a bottleneck communications link or a server capacity. The entities can be served in some service increments, one at a time. For example, the service increment for a network flow is one packet (or cell, in the ATM terminology). A device, called the Scheduler, needs to determine the order of service for different entities so that the average service rate received by an entity is its assigned rate R(i). Aside from guaranteeing the long-term average rate, an important goal is to bound the discrepancy between the ideal and the actual service times of each individual service increment, i.e., each packet of each flow.

An example of an environment where such a problem occurs is a processor which must schedule jobs competing for its cycles. If all jobs are of equal importance, then it is desirable to provide all jobs an equal share of the processor capacity. If however, the jobs have different importance, a possible strategy is to assign weights to all jobs corresponding to their importance, and provide each job a share of processor capacity proportional to the weight assigned to the job. In this case the desired service rates are determined by the weights of the jobs. An alternative approach might be to assign rates to jobs according to some other rule, which is specific to a particular policy and environment of the problem. For example, a rule might be to give some fixed allocation to high priority jobs and then share the remaining bandwidth among low priority jobs.

As mentioned earlier, another example when a similar problem might occur is in computer networks. For example, in ATM networks there is usually some rate associated with every flow traversing the network. This rate can be either the result of negotiation with the network at setup time, as for example for Constant Bit Rate (CBR) traffic, or can be the result of a traffic management feedback control scheme as is the case for Available Bit Rate (ABR) traffic. The set of rates can be either relatively static, as for long-term CBR flows, or may change quickly in response to congestion as in the case of ABR flows.

Even if the rates are not assigned explicitly, which is the case, for example, in many packet-switching networks, different flows may be of different importance. For example, one flow may be a compound flow of data from 1000 users, while another flow may represent a single user. It may be reasonable in such a case to assign weights to different flows given their relative importance. If the total demand of flows exceeds the capacity of the bottleneck resource, typically a communication link, then a possible policy is to service all flows proportionally to their weights as described earlier in the example of processor sharing. This effectively assigns rates to the flows.

In recent years, rate-based scheduling disciplines at the switching points in computer networks have received much attention. A comprehensive review of such schemes can be found in Hui Zhang, *Service Disciplines for Guaranteed Performance in Packet-Switching Networks*, Proceedings IEEE, October 1995. These schemes generally are applicable at network switches and can guarantee rates assigned to the flows.

The problem of scheduling of different flows in computer networks exists not only for the switches in the network, but in host adapters as well. For example, an adapter in an ATM network must schedule different flows, each of which has a rate associated with it. Typically, the CBR flows are serviced at a higher priority according to a pre-computed schedule. One of the disadvantages of pre-computing the CBR schedule is that because it is computed without taking any non-CBR flows into account, the service of non-CBR flows may be unnecessarily adversely affected by the CBR bursts. Pre-computing the schedule also has the disadvantage that it is computationally expensive and is usually done in software on a slow time scale. While this may be acceptable for CBR flows which only need to perform this once a new connection is established, it is not feasible if many flows with frequently changing rates need to be scheduled.

Another scheme that is known for rate-based scheduling is the so-called Leaky Bucket, described for example in The ATM Forum Traffic Management Specification Version 4.0. The scheme requires a large amount of per flow state and therefore is prohibitive for a large number of flows.

Also frequently used is the so called "time-wheel" or "calendar queue" approach. An example of the calendar queue approach may be found in Brown., R, *Calendar Queue: A fast O(1) priority queue implementation for the simulation even set problem*, Communications of the ACM, vol.31, pp.1220–1227. Unlike the Leaky Bucket scheme, the calendar queues are simple to implement. Unfortunately, in general the calendar queue approach cannot guarantee that the long-term average rate achieved by a flow is equal to its assigned rate.

Therefore, it is desirable to design a scheme that may be used for rate-based scheduling of flows with dynamically changing rates at networks adapters and that can guarantee the assigned rate of the flows.

It is also desirable that this scheme be of use for CBR-type traffic (also known as "guaranteed service" in packet switching networks) and ABR-type traffic (also known as adaptive traffic) simultaneously, as well as VBR (variable bit rate) traffic in ATM networks (also known as predictive traffic in packet switching networks). Finally it is desirable that this scheme be useful in the more general context of rate-based scheduling as described earlier.

What is needed is a general approach to rate scheduling that will work in many different environments. In particular, the new approach should work well for network adapters as well as for network switches.

The approaches described in the paper by Hui Zhang for switch scheduling are not easily applicable to adapters. One of the reasons for this is that most of the scheduling schemes for switches rely on packet arrival times to the switch to determine the scheduling order of packets from different flows. The notion of arrival time is not always well-specified for the adapter A new scheme, referred to as the Relative Error (RE) Scheduler, was described in copending U.S. patent application Ser. No. 08/579,393. The RE scheme has several appealing properties, the most important of which is that the descrepancy between the ideal transmission time of any cell and its actual transmission time is bounded, thereby providing a stringent rate guarantee for any flow.

However, the RE scheme as described in U.S. patent application Ser. No. 08/579,393 required finding the maximum of n numbers (where n is the number of flows to be scheduled), all of which had to be updated at each step of the method. Thus, complexity of the RE scheme is O(n), where n is the number of flows to be scheduled. In addition, RE requires that the rates assigned to different jobs be pre-scaled so that the sum of all rates does not exceed the service capacity. Therefore, any time a change of some flow rate cause infeasibility of the total set of rates, the rates of all flows may need to be recalculated to ensure feasibility. Scheduling decisions (especially when scheduling flows in high-speed networks), must be made in a very short time (typically of the order of a few microseconds). A scheduler may need to support thousands of flows, which makes the task of quickly scanning and updating entries corresponding to each flow extremely difficult. Therefore, reducing the computational complexity of the scheme is very important.

The present invention describes two ways of reducing the complexity of the RE scheme:

a) by reducing the amount of state that needs to be scanned at each cell time by means of the discrete rate approach b) by providing means for on-line proportional scaling of the flow rates up or down to the link capacity.

The latter allows not only avoiding the extra work needed to make sure that the rates do not exceed the link bandwidth but can be optionally used to proportionally increase the service rate of all flows if the sum of the nominal requested rates of all flows is less than the available bandwidth.

SUMMARY OF THE INVENTION

A method of scheduling a plurality of data flows in a shared resource in a computer system, each of the data flows containing a plurality of data cells, is provided, including the steps of providing a scheduler in the shared resource, initializing the scheduler to receive the plurality of data flows, receiving a first data flow in the scheduler, said first data flow having a first flow rate, receiving a second data flow in the scheduler, said second data flow having a second flow rate, scheduling, by the scheduler, the first data flow and the second data flow such that the first flow rate and the second flow rate are less than an available bandwidth in the shared resource and a relative error is minimized between an actual scheduling time and an ideal scheduling time on a per cell basis, and repeating the steps of receiving and scheduling.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DESCRIPTION OF THE PREFERRED EMBODIMENT(S)

Figure 1:
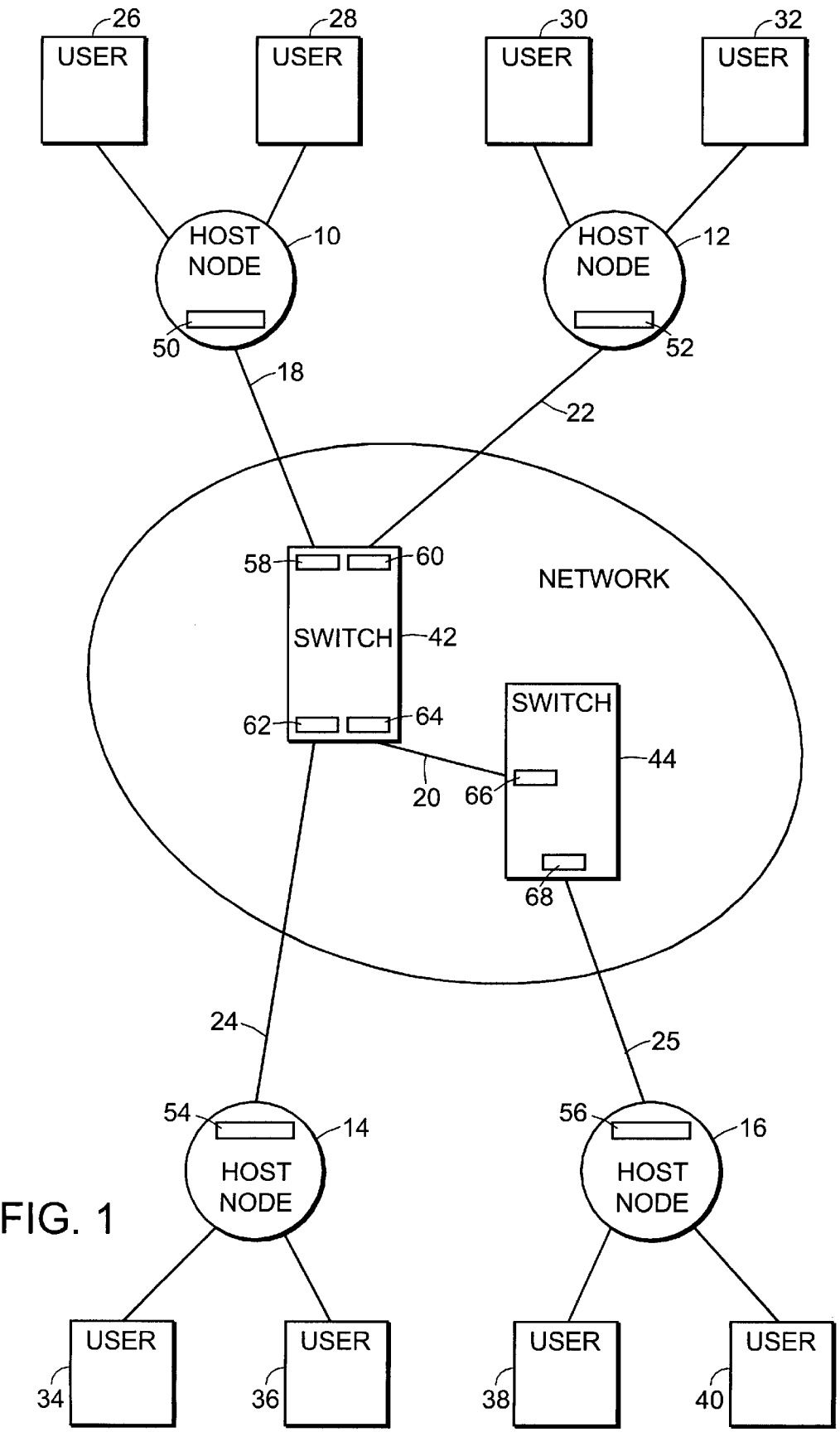
FIG. 1 is a block diagram of an exemplary computer network in which the present invention may be used.

A preferred embodiment of the present invention will be described in the context of a computer network. Referring to FIG. 1, an exemplary network is shown to include four host nodes labeled as 10, 12, 14, and 16. Each of the host nodes is also shown to be shared by a number of users. Specifically, host node 10 has users labeled as 26 and 28, host node 12 has users labeled as 30 and 32, host node 14 has users labeled as 34 and 36, and host node 16 has users labeled as 38 and 40.

The exemplary network shown in FIG. 1 also includes two switches labeled as 42 and 44. Users communicate through the network with each other. For example, user 26 at host node 10 communicates with user 36 at host node 14, user 28 at host node 10 communicates with user 38 at host node 16, and users 30 and 32 at host node 12 communicate with users 38 and 40 at host node 16, respectively.

The host nodes are shown connected to the switches, and the switches are shown connected to each other, by way of communication links, typically bidirectional. For example, link 18 connects host node 10 to switch 42, and switches 42 and 44 are connected by a link 20. Link 22 connects host node 12 to switch 42, link 24 connects switch 42 to host node 14, and link 25 connects switch 44 to host node 16. For convenience, we shall associate the flow of data from a source to a destination with the source of the flow. For example, we shall refer to the flow from user 26 to user 36 as "the flow of user 26."

Each of the host nodes 10, 12, 14, and 16 are shown to include a scheduler. Specifically, host node 10 has a scheduler 50, host node 12 has a scheduler 52, host node 14 has a scheduler 54, and host node 16 has a scheduler 56. Typically, the scheduler resides in a host adapter card (not shown).

Each of the switches 42 and 44 is also shown as having a scheduler associated with each link connected to the switch. For example, switch 42 contains a scheduler 58 associated with link 18. Scheduler 60 is associated with link 22, scheduler 62 is associated with link 24, and scheduler 64 is associated with link 20. Switch 44 contains a scheduler 66 associated with link 20, while scheduler 68 is associated with link 25.

Each of the schedulers shown in FIG. 1 is responsible for scheduling different flows which share common resources within the exemplary network. By way of example, we shall assume that a limiting (or "bottleneck") resource is a link's capacity. For example, assume that all links in the network are of capacity 155Mbs except link 20, which has capacity of 50Mbs. Therefore, user 28, user 30, and user 32 share a common bottlenecked link, i.e., link 20. To insure fairness, each of these users can therefore transmit data at one third of the capacity of link 20, i.e., at approximately rates R(2)=R(3)=R(4)=16.67 Mbs. User 26 can therefore transmit data at the full remaining bandwidth of link 18, i.e., at R(1)=138.33 Mbs. However, any other transmission rate assignment is possible, as long as the sum of rates of user 26 and user 28 does not exceed 155Mbs, which is the capacity of link 18, and the sum of the rates of user 28, user 30, and user 32 does not exceed 50Mbs, which is the capacity of link 20. The average service rate that the scheduler provides to each user must be equal to the rate assigned to these users. Thus, scheduler 50 is responsible for scheduling flows submitted to host node 10 by user 26 and user 28 at rates R(1) and R(2) respectively.

The present invention may reside in any of the schedulers shown in FIG. 1 and relates to a method and apparatus of rate-based scheduling and weighted fair sharing of a common resource.

By way of example, an exemplary embodiment of the present invention will be described in the context of flows in the exemplary network of FIG. 1. However, the present invention is adapted to any computer application that requires a weighted fair rate service in scheduling computer jobs. The exemplary embodiment will use an Asynchronous Transfer Mode (ATM) network as an example. ATM networks use fixed length data packets generally referred to as ATM cells. However, as mentioned above, the present invention may be generalized to variable length data packets.

Using an ATM network as a specific example, the present invention may reside in an adapter (not shown), the adapter having a scheduler (i.e., 50, 52, 54, and 56) contained in each of the host nodes 10, 12, 14, and 16, and/or in the schedulers 58, 60, 62, 64, 66, and 68 of switches 42 and 44.

The present invention is based on the idea of the RE scheduler described in copending U.S. patent application Ser. No. 08/579,393. Like the original RE scheduler, the Relative Error approach described herein is used to determine the scheduling order. However, unlike the RE scheduler, the present invention no longer requires maintaining and updating the relative error term for each flow. Instead, flows are organized into groups according to their rates. A predetermined set of discrete rates R(1), R(2), ... R(n) is chosen according to some rule. For example, with 10% rate granularity, one can chose 61 discrete rates spanning the range from 64 kbs to 155 Mbs. Once the set of discrete rates is chosen, all flows with a discrete rate R(k) assigned to them are assigned to group G(k). The RE scheduler is now applied to the groups rather than to individual flows. The rate of group G(k) is simply m(k)R(k), where m(k) is the number of flows in group k corresponding to the discrete rate R(k). Within each group, the flows are chosen according to a simple round robin order. The overall structure of the scheduler of the present invention is shown in FIG. 2.

Figure 2:
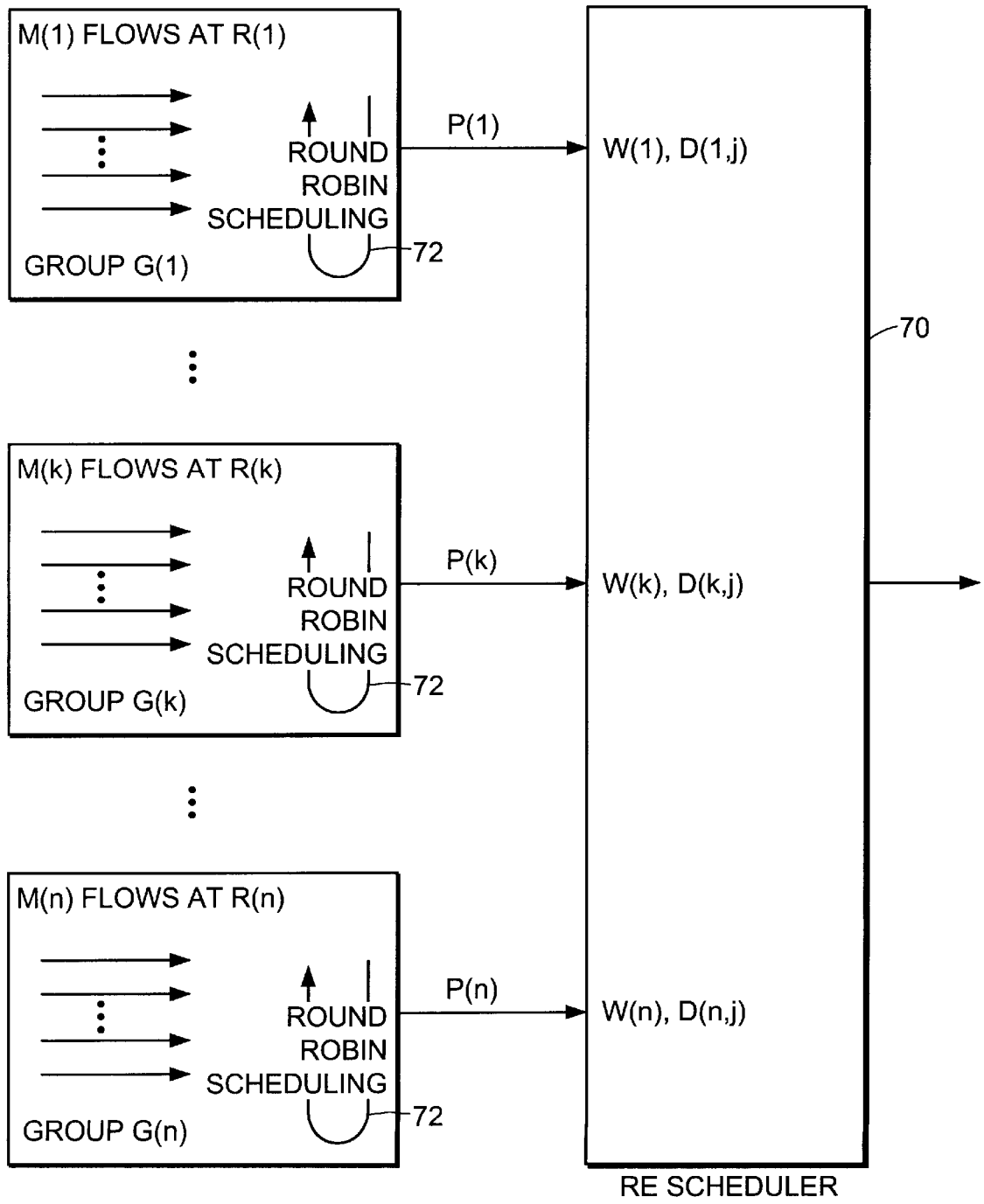
FIG. 2 is block diagram illustrating an overall structure of the scheduler with respect to the relationship between individual flows and groups of flows.

Referring to FIG. 2, the scheduler consists of two parts: the RE Scheduler, which maintains per-group variables D(k,j) and W(j), and several round-robin schedulers, each operating on a group of flows corresponding to a single discrete rate. The value of the variable W(k) for group G(k) is maintained as W(k)=m(k)R(k)/C, where m(k) is the number of flows in group G(k) and C is the total link bandwidth. When the RE scheduler 70 schedules a particular group G(k), the round robin scheduler 72 picks the next flow in its group (pointed to by variable p(k)), to be scheduled. Thus, the RE scheduler now needs to maintain only a reasonably small number of variables regardless how many flows need to be scheduled.

Another improvement of the present invention over U.S. patent application Ser. No. 08/579,393 is that in the present method it is no longer necessary to ensure that the sum of rates does not exceed the link bandwidth. This issue is fully described below in the section entitled "Dynamic Scaling of Relative Rates."

In the context described, the problem of scheduling of flows through and by any switch or adapter may be formulated as follows.

Given:

n flows indexed by integers 1,2, ... n sharing a slotted link (any switch or adapter) of capacity C each flow i is assigned a rate R(i).

At the beginning of j-th link cell-slot the scheduler needs to determine which flow (if any) must be scheduled for transmission so that the long-term average rate of flow i is guaranteed to be $$R(i) \text{ if } \sum_i R(i) \le C,$$

or proportionally scaled down to the link bandwidth otherwise, with bounded discrepancy between the actual and ideal transmission times of each cell.

The pseudocode of the RE Scheme, fully descibed in copending U.S. patent application Ser. No. 08/579,393, is included in Appendix A for completeness.

The Discrete Rate Relative Error Scheduler

For the description of the Discrete Rate Scheduler we shall assume that $$\sum_i R(i) \le C.$$

Later, we shall remove this restriction when we describe dynamic rate scaling for the RE Scheme. As mentioned above, we use the RE scheduler to arbitrate among the groups. Instead of maintaining variables D(i,j) per flow, we will now maintain them per group. That is, we shall compute D(k,j), $0 \le k \le K$ from $$D(k,j+1)=D(k,j)+W(k)-1 \tag{1a}$$

if cell of group k scheduled in slot j $$D(k,j+1)=D(k,j)+W(k) \tag{1b}$$

if cell of group k not scheduled in slot j

Here W(k) denotes the relative rate of the group defined as W(k)=m(k)R(k)/C, where m(k) is the number of flows in group G(k) corresponding to rate R(k). Group G(0) corresponds to the "virtual" flow of the RE Scheduler as described in copending U.S. patent application Ser. No. 08/579,393. The virtual group does not contain any real flows. Whenever a group is scheduled, the flow within a group to be scheduled in this group opportunity is chosen using a simple round-robin sequence.

Introducing discrete rates also affects the actions needed to be taken upon a rate change when a rate of some flow changes. In the continuous rate RE scheme the only other flow affected by this change is the "virtual flow". In the case of the discrete rate implementation, the rate change of a single flow may cause the change of rates for 3 groups, since the flow may be moved from one group to another, and the virtual flow rate may be changed as well. This causes a modification to the Rate_Change routine of the RE_Scheduler described in Appendix A, since we now need to do two consequent rate changes instead of one per a single rate change.

---

-continued

```
        if ((f>0)&&(flow p(f) in group G(f) has a cell to send))
            transmit next cell from flow p(f)
        else do not transmit (transmit an idle cell)
        p(f) = next flow in round-robin order of group G(f)
        j=j+1;
        D(f,j)=D(f,j)+W(f) − 1;
        for all k ≠ f
            D(k,j)=D(k,j)+W(k);
    }
```

Rate_Change:

---

```
    /* here index "old" denotes the value of the corresponding variable before the
    rate change, and index new the value of the variable after the rate change */
        if rate of flow i>0 changed from rate R(f1) to rate R(f2)
            remove flow i from group G(f1)
            add flow i to group G(f2)
            Wnew(f1) = Wold(f1) − R(f1)/C;
            Wnew(f2) = Wold(f2) + R(f2)/C;
            Wnew(0)= Wold(0) + Wold(f1) − Wnew(f1) + Wold(f2) − Wnew(f2)
            Adjust(Dnew(f1, j), Dnew(f2,j), Dnew(0,j))
        where
            function Adjust here can be any function which sets variables Dnew(f1,
    j), Dnew(f2,j), Dnew(0,j) so that the following conditions hold: −1 + Wnew (j) a
    Dnew(i,j) a 1 + Wnew(i), i = f1, f2, 0 and Dnew(f1,j) + Dnew(f2,j) + Dnew(0,j) =
    Dold(f1,j) + Dold(f2,j) + Dold(0,j).
```

---

An example pseudocode of the discrete rate implementation is given below. It was mentioned earlier that the pseudocode assumes that the sum of all rates does not exceed the link capacity.

Variables:

$W(k)$—relative combined rate of group $G(k)$ corresponding to rate $R(k)$ $D(k,j)$—relative error accumulated by group $G(k)$ at time slot $j$ $p(k)$—next flow to be scheduled within group $G(k)$ Initialization:

j=0;

for all flows i with rate $R(k)$, 0<k☐K assign flow i to group $G(k)$ corresponding to rate $R(k)$ $$R(0) = C - \sum_{k>0} m(k)R(k)$$

for all $0 \leq k \leq K$

{

W(k)=m(k) R(k)/C;

D(k,0)=0;

p(k) = flow 1;

}

Discrete_Rate_RE_Scheduler:

---

```
    do forever
    {
        find group G(f) with D(f,j)=max_{k}D(k,j)
```

It is apparent that once the rates of all flows have stabilized, the bounds on the discrepancy of the ideal and actual transmission times proved for all flows for the RE scheme hold at the group level for the discrete rate implementation described here. Therefore, the group $G(k)$ with $m(k)$ flows at rate $R(k)$ is guaranteed the long-term average rate $m(k)R(k)$. Due to the round-robin service within the group, any flow f within a group k is scheduled precisely every $m(k)$ group cell opportunities, which implies that every flow inside the group is guaranteed its rate $R(k)$.

Figure 3:
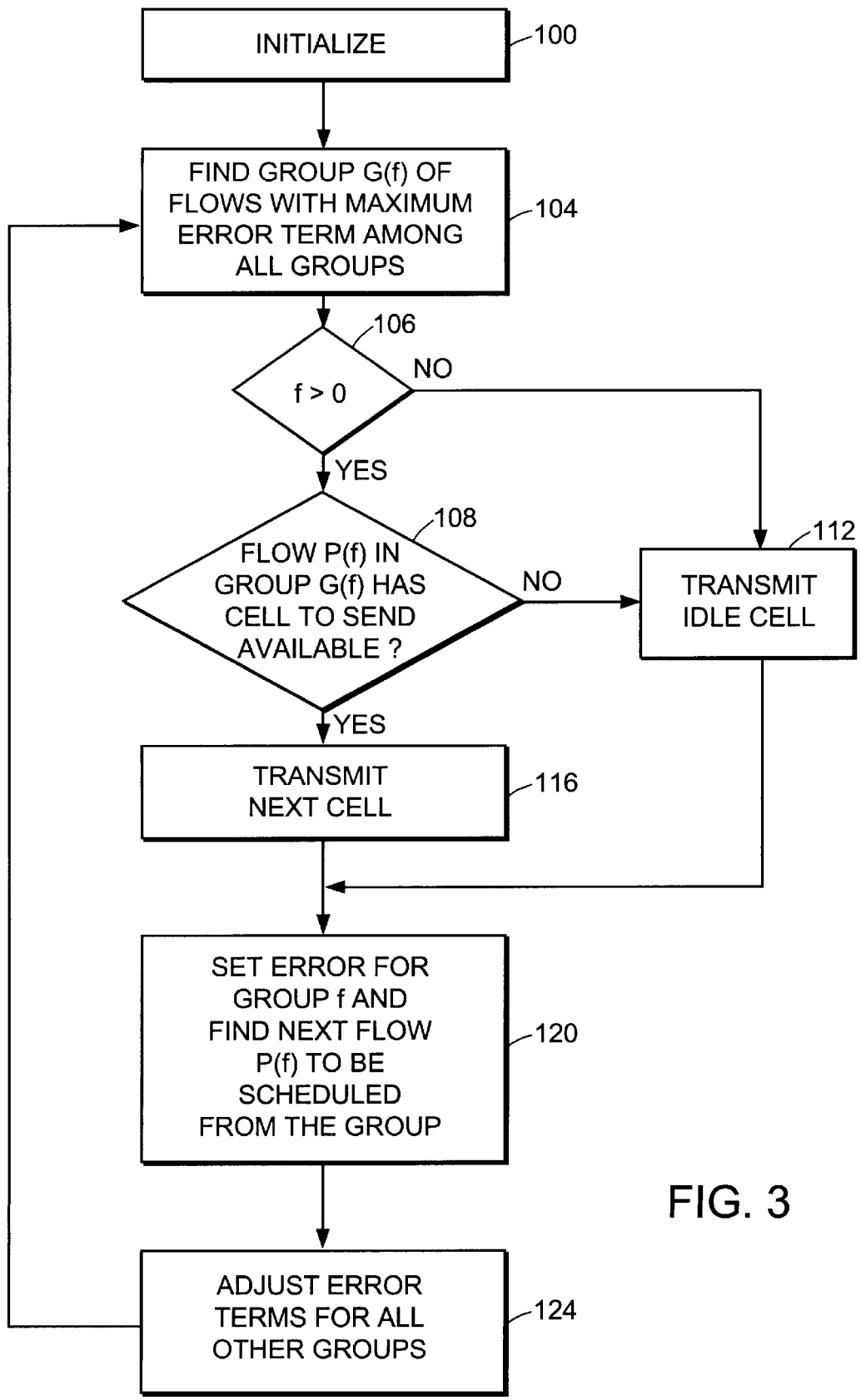
FIG. 3 is a flow chart illustrating the invention as it resides in the scheduler 50 of host node 10 of FIG. 1.

Referring now to FIG. 3, a flow chart of the operation of the RE scheme as it executes in any of the schedulers of FIG. 1 is shown. The process begins at step 100 wherein the scheduler conducts an initialization. During the initialization, the following is executed by the scheduler. A link cell slot index is set equal to 0. A virtual flow rate R(0) is set equal to the difference between the available bandwidth C and the sum of all rates of real flows i=1, 2, . . . n. Finally, for all group rates i=1, 2, . . . n, a rate of flow for each flow rate i relative to the total bandwidth C is set equal to (the quotient of the rate of flow i and the total available bandwidth C) multiplied by the number of flows in the group, and an error term for each flow i at link cell slot 0 is set equal to 0. The round-robin pointer is initialized for all groups k to flow 1 in the group.

At step 104 the scheduler finds group G(f) with an error term D(f,j) equal to the maximum of the error terms D(k,j) for all groups.

At step 106 the scheduler checks whether the flow f is greater than zero.

At step 108 the scheduler checks if a cell of flow p(f) next to be scheduled from group G(f) is available. If not, then at step 112 an idle cell is transmitted. If so, at step 116 the next cell from the group of flow G(f) is transmitted.

At step 120, p(f) is set equal to the next flow in the round robin of group G(f) and the link cell slot index is incremented by 1 and the error term for group f at link cell slot j is set equal to the error term for group f at link cell slot j plus the rate of group f relative to the total available bandwidth C minus 1.

At step 124, for all groups other than group G(f) the error term for flow i at link cell slot j is set equal to the error term for flow i at link cell slot j plus the rate of flow i relative to the total available bandwidth C. The scheduler then returns to step 104 to continue.

Dynamic Scaling of Relative Rates

For simplicity in this section we assume the continuous rates implementation of the RE scheme. The results of this section constitute an improvement of the RE Scheme as described in copending U.S. patent application Ser. No. 08/579,393 regardless of whether discrete or continous rates are used. So far we have assumed that the sum of all rates never exceeds the link bandwidth. This requirement imposes the necessity to prescale rates down to the link bandwidth. This part of the preferred embodiment describes how to avoid this prescaling. Namely, given arbitrary rates R(f) of flows f, the modified RE scheme guarantees rates r(f) to all flows f such that $\Sigma r(f)=C$ and $r(i)/rj)=R(i)/Rj$ for any two flows i and j.

The modification of the RE scheme, fully described in copending U.S. patent application Ser. No. 08/579,393, required to achieve this, is very straightforward and impacts only the iterative equations of (1a,b), which become as follows:

$$D(i, j+1) = D(i, j) + V(i) - \sum_i V(i) \quad \text{if cell of } i \text{ scheduled in slot } j \quad (2a)$$

$$D(i, j+1) = D(i, j) + V(i) \quad \text{if cell of } i \text{ not scheduled in slot } j \quad (2b)$$

Here $V(i)=R(i)/C$ denotes relative rates which are are no longer pre-scaled. The remaining part of the RE algorithm remains unchanged.

This modification can be used not only to proportionally scale the rates down to link bandwidth, but also to scale the rates up to the link bandwidth if the sum of rates is less than the link bandwidth. If up-scaling is desired, then the virtual flow should not be used. In certain cases, for example when the assigned flow rates constitute the maximum allowed rate (as in the case of rate-based feedback schemes) scaling the rates up may not be allowed, while scaling the rates down can be either desirable or acceptable. In such cases proportional scaling can be used only if the link is overbooked, while the "virtual flow" approach as described above can be used if the link is underbooked.

It will now be shown that changing (1a) to (2a) provides proportional rate scaling for the continuous rate RE implementation. That is, we will show that the sequence of cell transmissions determined by the execution of RE with variables D(i,j) updated by (1a,b) with proportionally scaled relative rates W(i) is identical to the sequence of transmissions determined by (2a,b) with unscaled relative rates V(i).

Let R(i) be the nominal assigned rate of flow i, and r(i) be its rate proportionally scaled, so that $$\sum_i r(i) = C \text{ and } r(i)/r(j) = R(i)/R(j). \text{ Denote } R = \sum_i R(i).$$

Denote $V(i)=R(i)/C$ the unscaled relative rate of flow i. Then, replacing W(i) in (1a,b) by $W(i)=r(i)/C=R(i)/R=V(i)C/R$, we can rewrite (1a,b) as $$D(i,j+1)=D(i,j)+V(i)C/R-1 \quad (3a)$$

if cell of i scheduled in slot j $$D(i,j+1)=D(i,j)+V(i)C/R \quad (3b)$$

if cell of i not scheduled in slot j

Now, multiplying both sides of (3a,b) by R/C and noting that $$R/C = \left(\sum_i R(i)\right)/C = \sum_i V(i),$$

we get $$R/CD(i, j+1) = R/CD(i, j) + V(i) - \sum_i V(i), \quad \text{if cell of } i \text{ scheduled in slot } j \quad (4a)$$

$$R/CD(i, j+1) = R/CD(i, j) + V(i) \quad \text{if cell of } i \text{ not scheduled in slot } j \quad (4b)$$

Finally, denoting $D(i,j)=R/C\, D(i,j)$ we can rewrite (4a,b) as $$\Delta(i, j+1) = \Delta(i, j) + V(i) - \sum_i V(i) \quad \text{if cell of } i \text{ scheduled in slot } j \quad (5a)$$

$$\Delta(i, j+1) = \Delta(i, j) + V(i) \quad \text{if cell of } i \text{ not scheduled in slot } j \quad (5b)$$

Note that (5a,b) are identical to (2a,b) except D(i,j) in (2a,b) is replaced by D(i,j) in (5a,b). Since initially D(i,0)=0, then D(i,0)=R/C D(i,0)=0 as well. Therefore, (2a,b) and (5a,b) yield exactly the same values of D(i,j) and D (i,j) for any i and j. Hence, the sequence of scheduling opportunities given by the RE scheduler using (2a,b) is identical to that of the RE scheduler using (5a,b). On the other hand, (5a,b) is also equivalent to (1a,b) since we obtained (5a,b) from (1a,b) by a series of equivalent transformations. This proves that (2a,b) can be used to compute D(i,j) in the RE scheduler using nonscaled rates to yield the same result as if flow rates had been prescaled.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

APPENDIX A

The following variables are used in the RE Scheme:

D(i,j) error term for flow i at link cell slot j

R(i) rate of flow i (i=0 corresponds to the "virtual flow" (fiilly described below), whose rate is simply the difference between the available bandwidth C and the sum of rates of all real flows i=1,2, . . . n.

w(i) rate of flow i relative to the total available bandwidth C

Note: R(i) are required for initialization and rate changes only, and do not need to be stored in per flow state. Variables w(i) and D(i,j) are stored per flow.

The flow indexed by zero is the so-called "virtual flow". Its rate is simply the link bandwidth unused by all "real" flows. In this disclosure we will refer to flow 0 as a regular flow, and by sending a cell of flow zero we shall mean that an idle cell was sent (no cells of "real" flows transmitted).

Initialization of the procedure RE_Scheduler occurs in the following manner:

$$j=0;$$

$$R(0)=C - \sum_{i>0} R(i)$$

for all $i$

{

$$w(i)=R(i)/C;$$

$$D(i,0)=0;$$

}

The RE scheduler operates as described in the following pseudocode.
RE_Scheduler:
  do forever

```
{
    find flow f with D(f,j)=max_{i}D(i,j)
    if ((f>0) AND (cell of flow f available))
        transmit next cell from flow f
    else do not transmit (transmit an idle cell)
    j=j+1;
    D(f,j)=D(f,j)+w(f) − 1;
    for all if i ≠ f
        D(i,j)=D(i,j)+w(i);
}
```

Rate_Change:
  if rate of flow i<0 changed to Rnew(i)
    wold(i)=w(i);
    w(i)=Rnew(i)/C;
    Dold(i,j)=D(i,j);
    D(i,j)=w(i)−1;
    w(0)=wold(0)+wold(i)−w(i);
    D(0,j)=D(0,j)+Dold(i,j)−D(i,j).

What is claimed is:

1. A method of rate-based scheduling of data flows in a shared resource in a computer system, each of the data flows containing a plurality of data cells, comprising the steps of:
  organizing the data flows into flow groups according to each data flow's respective assigned rate of flow;
  providing a respective error term for a flow group equal to a relative error in transmission time accumulated by the flow group at a beginning of a link cell slot; and
  scheduling on a per data cell basis each of the flow groups as a function of the flow group's error term such that each of the data flows achieves a long term average flow rate that is substantially equal to that flow's assigned rate of flow.

2. The method of rate-based scheduling of data flows in the shared resource in the computer system according to claim 1 wherein the step of organizing comprises the steps of:
  choosing a set of predetermined discrete rates; and
  assigning data flows with an assigned rate of flow substantially equal to a predetermined discrete rate to the flow group corresponding to the predetermined discrete rate.

3. The method of rate-based scheduling of data flows in the shared resource in the computer system according to claim 1 wherein the step of providing a respective error term for a flow group comprises the steps of:
  setting a value of the link cell slot to zero;
  setting a value of a virtual flow rate equal to a difference between a value of available bandwidth in the shared resource and a value of a sum of the rates of flow of all the data flows;
  setting a relative combined rate of each flow group equal to a quotient of a combination of the rates of flow of each data flow in the flow group and the total available bandwidth;
  setting the error term for each flow group at link cell slot zero to the value of zero; and
  setting a next flow for each flow group to a value of one.

4. The method of rate-based scheduling of data flows in the shared resource in the computer system according to claim 1 wherein the step of scheduling comprises the steps of:
  selecting a flow group dependent on the flow groups' error term;
  selecting a data flow in the selected flow group dependent on the value of the flow group's next flow;
  determining whether a data cell of the selected data flow is available;
  sending a null cell if the step of determining determines that a data cell of the selected data flow is unavailable;
  transmitting the data cell if the step of determining determines that the data cell of the selected data flow is available;
  incrementing the link cell slot;
  setting the error term for the flow group at the link cell slot equal to the error term for the flow group at the link cell slot plus a relative combined rate of the flow group minus 1; and
  for each of the flow groups not equal to the selected flow group, setting the error term for the flow group at the link cell slot equal to the flow group's error term at the link cell slot plus the flow group's relative combined rate.

5. The method of rate-based scheduling of data flows in the shared resource in the computer system according to claim 1 further comprising the step of:
  modifying the data flow rates by on-line proportional scaling of the data flow rates up or down to the available bandwidth of the shared resource.

* * * * *